US011651793B1

(12) United States Patent
Li et al.

(10) Patent No.: US 11,651,793 B1
(45) Date of Patent: May 16, 2023

(54) DISK HUB FOR RETAINING MAGNETIC RECORDING MEDIA FOR FILM THICKNESS MEASUREMENT

(71) Applicant: Western Digital Technologies, Inc., San Jose, CA (US)

(72) Inventors: Lingyun Li, Guangdong (CN); Ao Fan, Guangdong (CN); Cheng Zhang, Guangdong (CN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/569,375

(22) Filed: Jan. 5, 2022

(51) Int. Cl.
| | |
|---|---|
| *G11B 19/20* | (2006.01) |
| *C08G 65/40* | (2006.01) |
| *G11B 17/022* | (2006.01) |
| *G11B 25/04* | (2006.01) |

(52) U.S. Cl.
CPC ...... *G11B 19/2045* (2013.01); *C08G 65/4012* (2013.01); *G11B 17/022* (2013.01); *G11B 25/043* (2013.01)

(58) Field of Classification Search
CPC ... G11B 17/022; G11B 17/028; G11B 25/043; C08G 65/4012
See application file for complete search history.

(56) References Cited

U.S. PATENT DOCUMENTS

| | | | | | |
|---|---|---|---|---|---|
| 4,403,319 | A | * | 9/1983 | Adamek et al. .... | G11B 17/0284 |
| 4,755,981 | A | * | 7/1988 | Ekhoff ............... | G11B 17/0282 |
| | | | | | 279/2.03 |
| 5,014,143 | A | * | 5/1991 | Mori .................. | G11B 17/0282 |
| | | | | | 720/707 |
| 5,025,340 | A | * | 6/1991 | Peters ................ | G11B 17/0282 |
| | | | | | 720/704 |

(Continued)

FOREIGN PATENT DOCUMENTS

| | | |
|---|---|---|
| CN | 1311430 C | 4/2007 |
| JP | 2001229528 A | 8/2001 |

(Continued)

OTHER PUBLICATIONS

Au-Yeung, V., Abstract of "FTIR determination of fluorocarbon lubricant film thickness on magnetic disk media," in IEEE Transactions on Magnetics, vol. 19, No. 5, pp. 1662-1664, Sep. 1983, doi: 10.1109/TMAG.1983.1062725, https://ieeexplore.ieee.org/document/1062725.

(Continued)

*Primary Examiner* — Brian E Miller
(74) *Attorney, Agent, or Firm* — Loza & Loza, LLP; Gabriel Fitch

(57) ABSTRACT

A disk hub is configured to retain a magnetic recording medium including an annulus shape and a layer configured for magnetic recording. The disk hub includes a base plate portion for supporting an inner diameter area of the magnetic recording medium and a stem portion on the base plate (Continued)

portion. The stem portion includes a frustoconical portion on the base plate portion and a top portion on the frustoconical portion. At least the top portion of the stem portion includes a material with a hardness less than that of stainless steel. The disk hub can reduce surface damages (e.g., scratches) on the media surface during media testing.

25 Claims, 7 Drawing Sheets

(56) References Cited

U.S. PATENT DOCUMENTS

| | | | | |
|---|---|---|---|---|
| 5,048,005 | A * | 9/1991 | Ekhoff | G11B 17/0282 |
| | | | | 720/707 |
| 5,056,082 | A * | 10/1991 | Ekhoff | G11B 17/0282 |
| | | | | 720/707 |
| 5,243,481 | A * | 9/1993 | Dunckley | G11B 25/043 |
| | | | | 360/99.08 |
| 5,872,682 | A * | 2/1999 | Sai | G11B 17/038 |
| 6,128,075 | A | 10/2000 | Brierley | |
| 6,205,113 | B1 * | 3/2001 | Fahey | G11B 23/0307 |
| | | | | 720/722 |
| 7,073,186 | B2 * | 7/2006 | Sugiyama | G11B 17/043 |
| 8,033,731 | B2 * | 10/2011 | Grantz | F16C 33/1025 |
| | | | | 384/100 |
| 8,553,518 | B1 * | 10/2013 | Ekhoff | G11B 17/0282 |
| | | | | 360/99.04 |
| 8,607,442 | B2 * | 12/2013 | Kodama | F16C 35/02 |
| | | | | 384/114 |
| 8,908,315 | B2 * | 12/2014 | Ozawa | G11B 5/455 |
| | | | | 360/75 |
| 8,920,872 | B2 | 12/2014 | Itoh et al. | |
| 9,156,139 | B1 * | 10/2015 | Ekhoff | B25B 5/122 |
| 2002/0141327 | A1 * | 10/2002 | Baum | G11B 17/022 |
| | | | | 720/709 |
| 2005/0132958 | A1 | 6/2005 | Leng et al. | |
| 2014/0118859 | A1 * | 5/2014 | Yun | F16C 33/74 |
| | | | | 310/90 |

FOREIGN PATENT DOCUMENTS

| | | |
|---|---|---|
| JP | 2002222513 A | 8/2002 |
| JP | 2008008681 A | 1/2008 |

OTHER PUBLICATIONS

Charter Coating Service (2000) LTD , "FTIR", Last accessed on Dec. 28, 2021; https://chartercoating.com/test-methods/ftir/; 2 pages.

Bruker, "Alpha II: Compact FT-IR Spectrometer", Last accessed on Dec. 28, 2021; https://www.bruker.com/en/products-and-solutions/infrared-and-raman/ft-ir-routine-spectrometer/alpha-ii-compact-ft-ir-spectrometer.html; 20 pages.

Applied Technical Services, "FTIR Testing", Last accessed on Dec. 28, 2021; https://atslab.com/chemical-analysis/ftir-testing/; 8 pages.

* cited by examiner

DISK HUB FOR RETAINING MAGNETIC RECORDING MEDIA FOR FILM THICKNESS MEASUREMENT

CROSS REFERENCE TO RELATED APPLICATION(S)

This application claims priority to and the benefit of pending Patent Application No. 202111638136.1, filed Dec. 29, 2021 at the China National Intellectual Property Administration Office of the People's Republic of China, entitled "DISK HUB FOR RETAINING MAGNETIC RECORDING MEDIA FOR FILM THICKNESS MEASUREMENT," and hereby expressly incorporated by reference herein as if fully set forth below in its entirety and for all applicable purposes.

FIELD

The present disclosure relates generally to information storage devices, and in particular, a disk hub for retaining a magnetic recording medium during a process for characterizing a lubricant film on the magnetic recording medium.

INTRODUCTION

Computer systems and various electronic devices can use magnetic storage devices for storing data and information. To read and/or write data, a magnetic storage drive (e.g., a hard disk drive) can employ a recording head (e.g., slider) that flies above the surface of a magnetic recording medium in close proximity. The magnetic recording medium may have a lubricant film formed on the media surface to protect the magnetic recording medium and the recording head (e.g., from potential contact events therebetween). In some examples, the lubricant film may be formed by a lubricant such as a perfluoropolyether (PFPE) class lubricant. A PFPE lubricant may provide excellent tribological and contamination robustness for hard disk media applications. The thickness of a lubricant film is often a parameter of interest in magnetic recording media manufacturing processes (e.g., lubrication processes). In some examples, it may be helpful to control the PFPE lubricant film thickness to one-tenth angstrom scale level.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One aspect of the disclosure provides a disk hub for retaining a magnetic recording medium including an annulus shape and a layer configured for magnetic recording. The disk hub includes a base plate portion for supporting an inner diameter area of the magnetic recording medium and a stem portion on the base plate portion. The stem portion includes a frustoconical portion on the base plate portion and a top portion on the frustoconical portion. At least the top portion of the stem portion includes a material with a hardness less than that of stainless steel.

One aspect of the disclosure provides an apparatus for characterizing a magnetic recording medium for a data storage device. The apparatus includes a disk hub configured to retain and enable the magnetic recording medium to be rotated to one or more positions. The disk hub includes a base plate portion for supporting an inner diameter area of the magnetic recording medium. The disk hub further includes a stem portion on the base plate portion. The stem portion includes a frustoconical portion on the base plate portion and a top portion on the frustoconical portion. At least the top portion of the stem portion includes a material with a hardness less than that of stainless steel. The apparatus further includes a measurement assembly configured to measure a thickness of at least one film on a data recording surface of the magnetic recording medium at the one or more positions.

One aspect of the disclosure provides a method of manufacturing a disk hub for retaining a magnetic recording medium including an annulus shape and a layer configured for magnetic recording. The method forms the disk hub using a thermoplastic polymer by providing a base plate portion for supporting an inner diameter of the magnetic recording medium and providing a stem portion on the base plate portion. The stem portion includes a frustoconical portion on the base plate portion and a top portion on the frustoconical portion.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In a similar fashion, while certain implementations may be discussed below as device, system, or method implementations, it should be understood that such implementations can be implemented in various devices, systems, and methods.

DETAILED DESCRIPTION

In the following detailed description, reference is made to the accompanying drawings, which form a part thereof. In addition to the illustrative aspects, aspects, and features described above, further aspects, aspects, and features will become apparent by reference to the drawings and the following detailed description. The description of elements in each figure may refer to elements of proceeding figures. Like numbers may refer to like elements in the figures, including alternate aspects of like elements.

The disclosure relates in some aspects to a disk hub for retaining and positioning a magnetic recording medium and a method for characterizing a film on the magnetic recording medium using the disk hub. The magnetic recording medium may be used in various data storage devices (e.g., hard disk drive).

Figure 1:
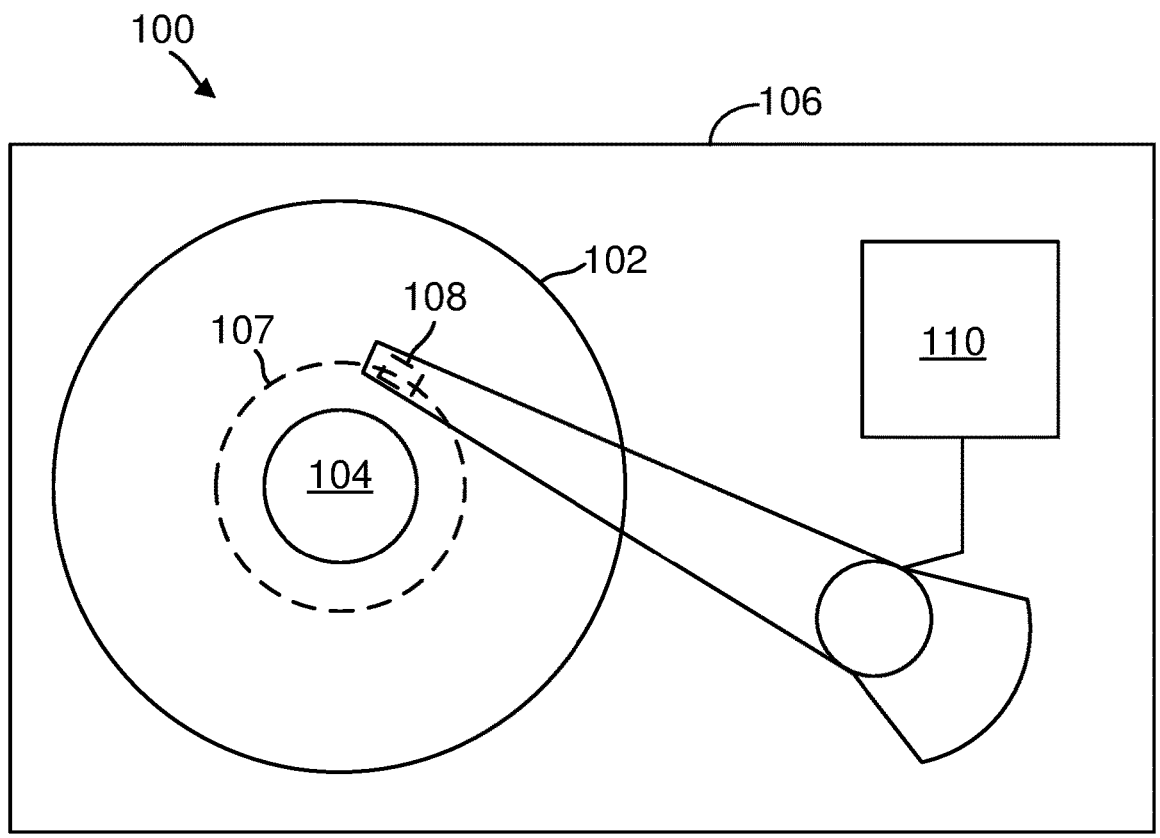
FIG. 1 is a top schematic view of a disk drive configured for magnetic recording including a slider and a magnetic recording medium in accordance with one aspect of the disclosure.

FIG. 1 is a top schematic view of a data storage device 100 (e.g., disk drive or magnetic recording device) configured for magnetic recording including a slider 108 and a magnetic recording medium 102 according to one or more aspects of the disclosure. The data storage device 100 may include one or more disks/media 102 to store data. The disk/media 102 resides on a spindle assembly 104 that is mounted to a drive housing 106. Data may be stored or recorded along tracks in the magnetic recording layer of disk 102. The reading and writing of data are accomplished with the recording head 108 (slider) that may have both write element (e.g., writer 108a) and read element (e.g., reader 108b). The write element 108a is used to alter the properties of the magnetic recording layer of disk 102 and thereby write information thereto. In one aspect, the head 108 may have magneto-resistive (MR) based elements, such as tunnel magneto-resistive (TMR) elements for reading, and a write pole with coils that can be energized for writing. In operation, a spindle motor (not shown) rotates the spindle assembly 104, and thereby rotates the disk 102 to position the head 108 at a particular location along a desired disk track 107. The position of the head 108 relative to the disk 102 may be controlled by the control circuitry 110 (e.g., a microcontroller). Some embodiments of the data storage device 100 are HAMR (heat assisted magnetic recording), EAMR (energy assisted magnetic recording), or non-EAMR magnetic data recording systems, including perpendicular magnetic recording (PMR) and shingled magnetic recording (SMR) disk drives or magnetic tape drives.

Figure 2:
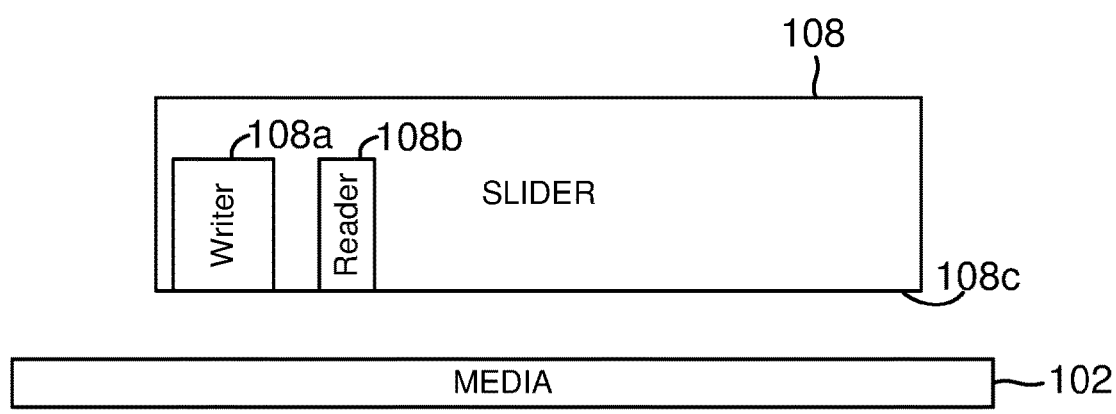
FIG. 2 is a side schematic view of the slider and magnetic recording medium of FIG. 1 in accordance with one aspect of the disclosure.

FIG. 2 is a side schematic view of the slider 108 and magnetic recording medium 102 of FIG. 1. The magnetic recording medium 102 may have a lubricant layer (e.g., lubricant layer 316 shown in FIG. 3) in accordance with one or more aspects of the disclosure. The slider 108 includes a write element (e.g., writer) 108a and a read element (e.g., reader) 108b positioned along an air bearing surface (ABS) 108c of the slider for writing information to, and reading information from, respectively, the media 102.

Figure 3:
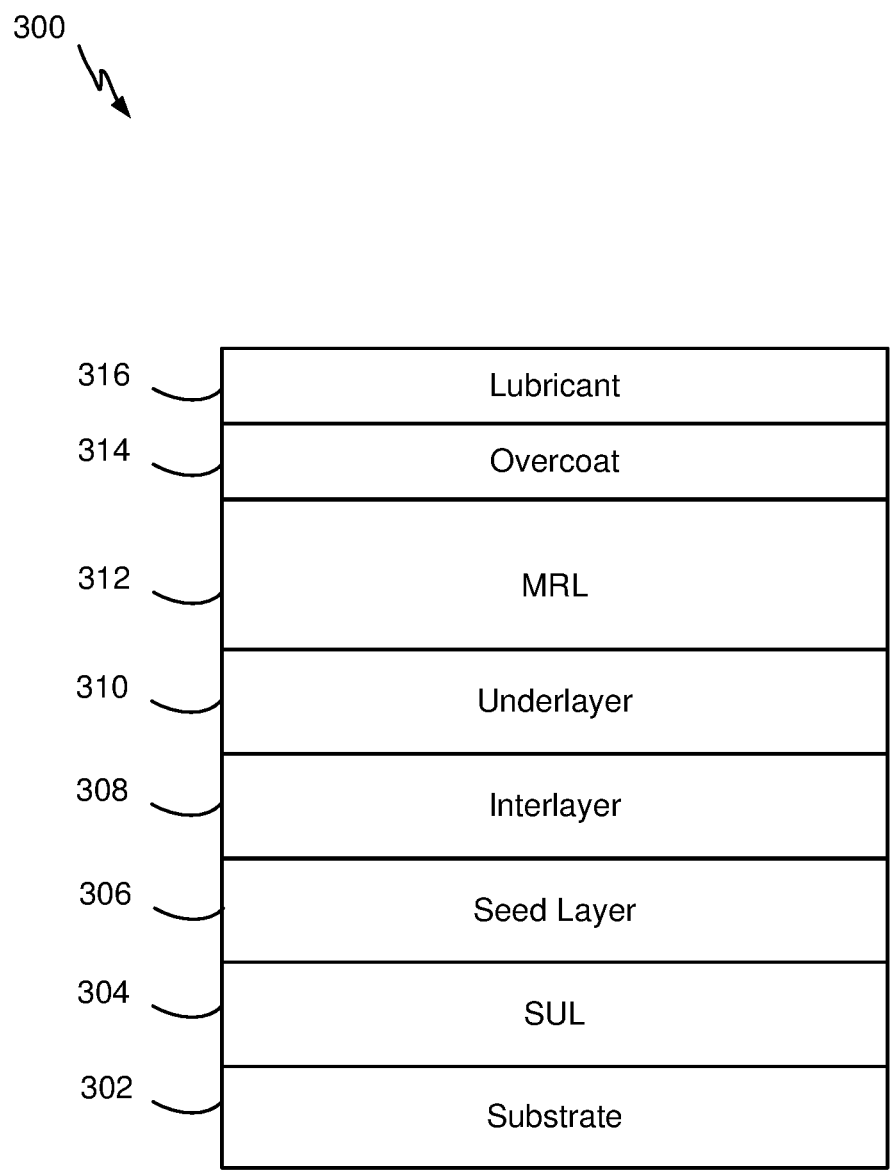
FIG. 3 is a side schematic view of a magnetic recording medium in accordance with one aspect of the disclosure.

FIG. 3 is a side schematic view of a magnetic recording medium 300 in accordance with one aspect of the disclosure. In some embodiments, the magnetic recording medium 300 may be configured for PMR. In other embodiments, the structures, systems, and/or methods described herein (to measure lubricant thickness) can be used with other media types including those configured for SMR, MAMR, or HAMR. The magnetic recording medium 300 has a stacked structure with a substrate 302 at a bottom/base layer, an amorphous soft magnetic underlayer (SUL) 304 on the substrate 302, a seed layer 306 on the SUL 304, an interlayer 308 on the seed layer 306, an underlayer 310 on the interlayer 308, a magnetic recording layer (MRL) 312 on the underlayer 310, an overcoat layer 314 on the MRL 312. In some embodiments, the medium 300 may have a lubricant layer 316 on the overcoat layer 314. In some aspects, the substrate 302 may be made of one or more materials such as an Al alloy, NiP plated Al, glass, glass ceramic, and/or combinations thereof. In one embodiment, the substrate 302 may be a rigid substrate (e.g., glass or ceramic).

In some aspects, the amorphous SUL 304 may be made of materials with high permeability, high saturation magnetization and low coercivity such as CoFe, and one or more elements selected from the group consisting of Mo, Nb, Ta, W, B, Zr, and combinations thereof. In some aspects, the seed layer 306 may be made of any suitable materials known in the art. The seed layer 306 has a certain lattice structure and crystallographic orientation that can determine the crystallographic orientation of a layer (e.g., interlayer 308) grown/deposited on the seed layer 306. In one embodiment, the seed layer 306 may be made of Ni alloys. In some aspects, the MRL 312 may be made of a CoPt alloy with or without additional other elements or oxides. In some aspects, the MRL 312 may be made of FePt or an alloy selected from FePtX, where X is a material selected from Cu, Ni, and combinations thereof. In some examples, the crystallographic orientation of the MRL 312 can facilitate PMR, SMR, MAMR, or HAMR. In some aspects, the overcoat layer 314 may be made of carbon.

The terms "above," "below," "on," and "between" as used herein refer to a relative position of one layer with respect to other layers. As such, one layer deposited or disposed on, above, or below another layer may be directly in contact with the other layer or may have one or more intervening layers. Moreover, one layer deposited or disposed between layers may be directly in contact with the layers or may have one or more intervening layers.

The lubricant layer 316 can provide protection to the magnetic recording medium 300 and/or the slider 108 during read/write operations when the slider 108 flies at a close distance (e.g., down to about 1 nm) over the surface of the magnetic recording medium 300. In some aspects, the lubricant layer 316 may be made of a polymer-based or liquid lubricant, for example, from the linear perfluoropolyether (PFPE) class of lubricants that provide excellent tribological and contamination robustness for magnetic recording media. The thickness of the lubricant layer 316 (e.g., a PFPE lubricant film) may be an important parameter in the manufacturing process (e.g., lubrication process) of the magnetic recording medium 300. For example, the thickness of the lubricant layer 316 may need to be controlled down to the one-tenth angstrom (A) scale level.

There are several technologies such as FTIR (Fourier transform infrared spectroscopy), ESCA (Electron spectroscopy for chemical analysis), XRR (X-ray reflectivity), and ellipsometry available for PFPE lubricant film thickness measurement. FTIR can be specifically suitable in magnetic media production due to its easy handling, fast analysis, and robustness even under a harsh environment. For example, FTIR testing can be used to determine the thickness of the lubricant layer 316 (e.g., a PFPE lubricant film) based on spectral characteristics obtained by FTIR testing.

Figure 4:
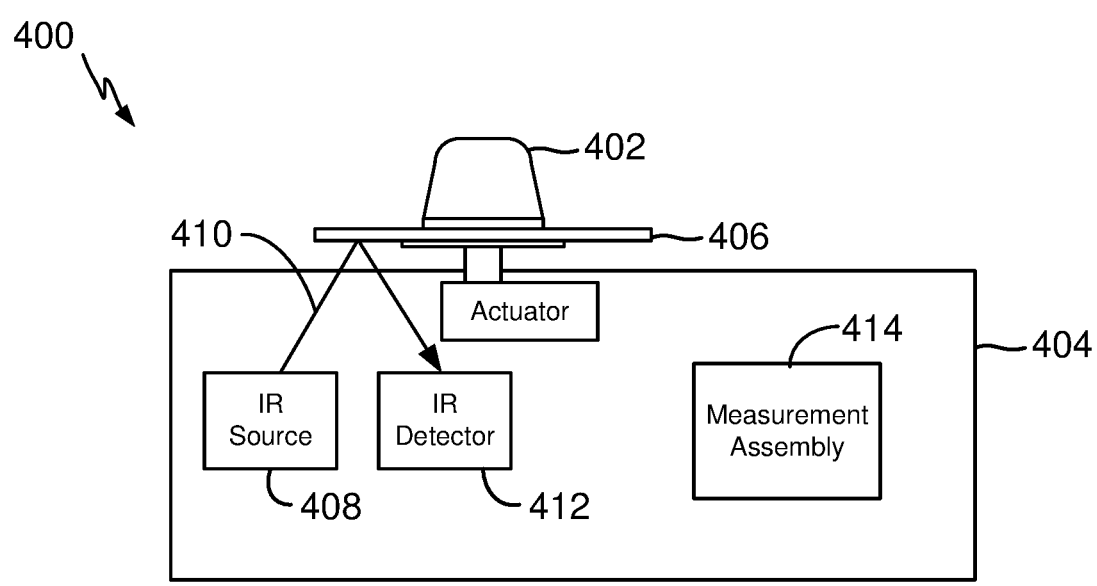
FIG. 4 is a block diagram conceptually illustrating an apparatus for measuring the film thickness of a lubricant layer on a magnetic recording medium in accordance with one aspect of the disclosure

FIG. 4 is a block diagram conceptually illustrating an apparatus 400 for measuring the film thickness of a lubricant layer in accordance with one aspect of the disclosure. The apparatus 400 may include a disk hub 402 that is installed on an FTIR testing device 404. A magnetic recording medium 406 may be loaded on the disk hub 402, for example, after a lubrication process (e.g., possibly one of the last steps in a process for fabricating the magnetic recording medium, such as the medium of FIG. 3). In one example, the magnetic recording medium 406 may be the same as the magnetic recording medium 300 described in relation to FIG. 3. The FTIR testing device 404 may have an infrared (IR) source 408 that can generate and output an IR beam 410 toward a surface (e.g., bottom surface in FIG. 4) of the magnetic recording medium 406. The IR beam 410 is reflected by the bottom surface (e.g., or top surface, either of which having a lubricant layer disposed thereon) of the magnetic recording medium 406 and can be detected by an IR detector 412 for signal processing and analysis using a measurement assembly 414 (e.g., an FTIR processing unit). The film thickness of a lubricant layer on the bottom surface of the magnetic recording medium 300 can be characterized or measured by the reflected IR beam 410, for example, proportional to the strength of the reflected IR beam. In one example, the FTIR processing unit 414 can determine the film thickness of the lubricant layer based on a pre-established calibration curve between IR reflection and film thickness.

In one example, film thickness data of multiple locations (e.g., four points collected at 90 degrees apart) on the media surface can be collected to determine whether the lubricant layer is uniformly applied on the surface of the magnetic recording medium 406. To that end, the magnetic recording medium 406 can be rotated about the disk hub 402 during the FTIR test so that the IR beam 410 can be reflected from different locations on the bottom surface of the recording medium 406. In some examples, the disk hub 402 may be made of a metal (e.g., stainless steel) suitable for clean room operations. However, a metal disk hub can easily scratch the surface of the magnetic recording medium 406 during FTIR testing. For example, when the medium rotates about the disk hub, scratches can form on the bottom surface of the recording medium 406. Test results have shown that a stainless steel disk hub can cause an undesirably high surface scratch rate (e.g., 10 to 25 percent) on FTIR measured media.

Figure 5:
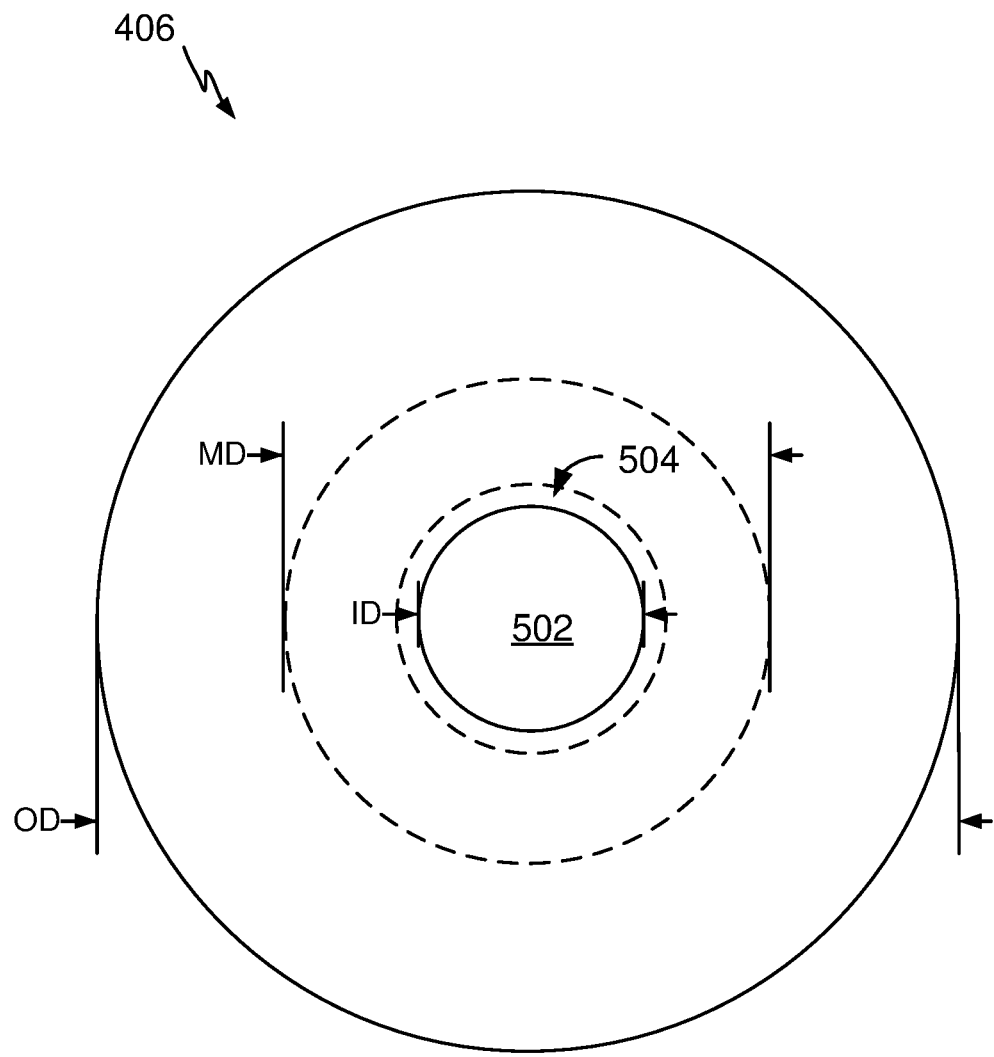
FIG. 5 is a drawing conceptually illustrating a surface of the magnetic recording medium shown in FIG. 4 in accordance with one aspect of the disclosure.

FIG. 5 is a drawing illustrating the bottom surface of the magnetic recording medium 406 when the medium is installed on the disk hub 402 described in FIG. 4. In some examples, the magnetic recording medium 406 has an annulus shape and a layer (e.g., MRL 312) configured for magnetic recording. When a metal (e.g., stainless steel) disk hub is used for holding and retaining the magnetic recording medium 406 during FTIR testing, surface damages (e.g., scratches) can occur on the media surface. The scratches often occur in an inner diameter area between the insider diameter (ID) of the opening 502 and a middle diameter (MD) of the magnetic recording medium. The MD can locate anywhere between the ID and an outside diameter (OD) of the magnetic recording medium. Furthermore, scratches or damages can occur anywhere between the ID and OD of the magnetic recording medium. The surface damages can be caused by incidental surface contact between the magnetic recording medium 406 and the disk hub 402 when the magnetic recording medium is installed on the disk hub 402. In addition, any rotation of the magnetic recording medium 406 about the disk hub 402 can introduce scratches (e.g., ring-shaped scratches) in the disk-to-hub contact area (e.g., area 504 in FIG. 5) of the magnetic recording medium 406. The scratches can create tiny particles that reduce the reliability of the magnetic recording medium 406.

Figure 6:
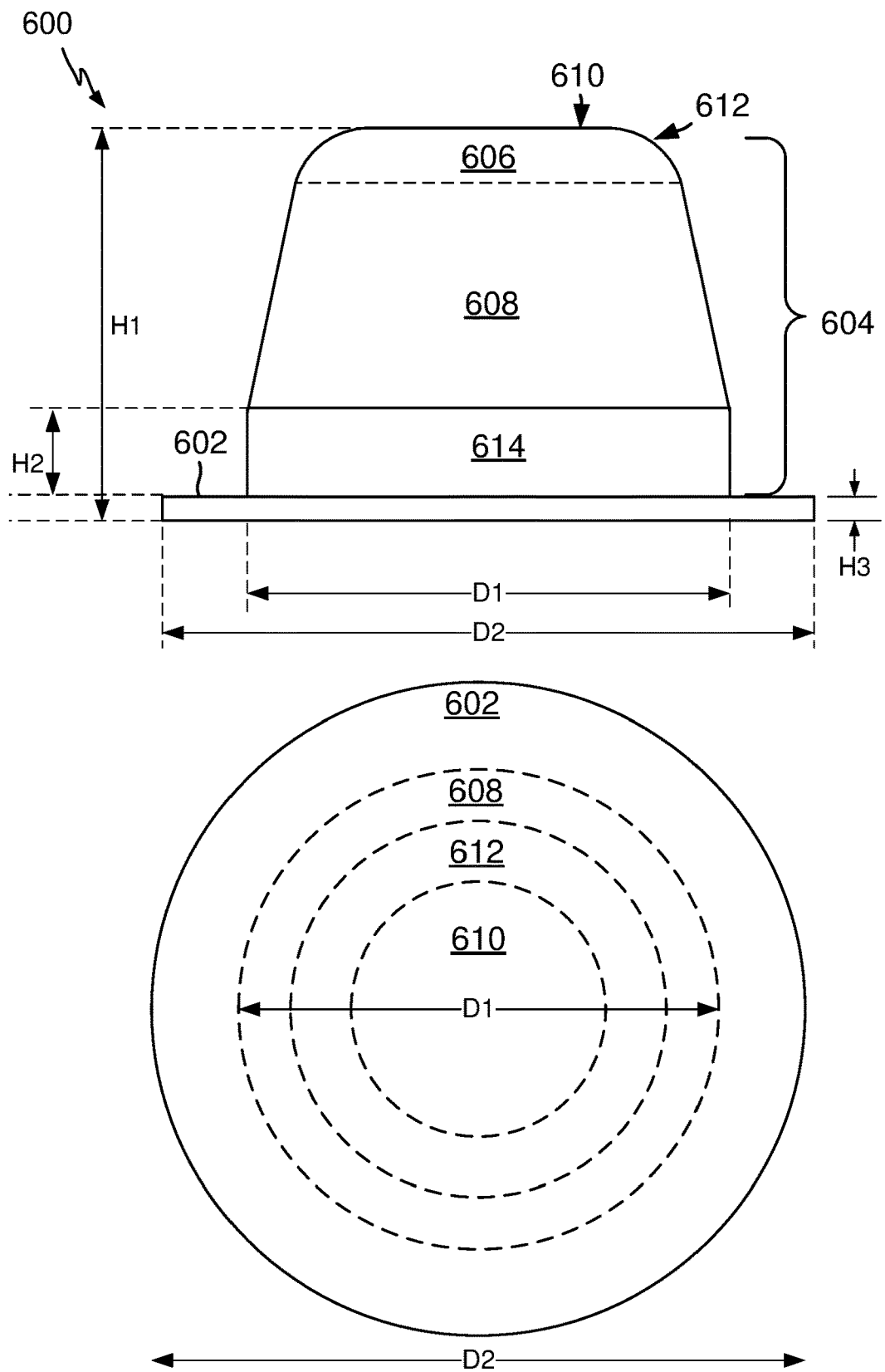
FIG. 6 is a drawing providing a top schematic view and a side schematic view of a disk hub according to one or more aspects of the disclosure.

FIG. 6 is a diagram illustrating a side view and a top view of a disk hub 600 according to one or more aspects of the disclosure. The disk hub 600 may be the same as the disk hub 402 described in relation to FIG. 4. The disk hub 600 has certain features that can reduce surface damages on a magnetic recording medium during FTIR testing and film thickness measurements. In some examples, the disk hub 600 can reduce a media scratch rate by about 15 percent (%), resulting in an increased production yield by about 0.02%.

The disk hub 600 is different from a typical disk hub (e.g., metal disk hub) in shape and material to reduce potential surface damages to a magnetic recording medium during FTIR testing. In some embodiments, the disk hub 600 may have a height (H1 in FIG. 6) between about 12 mm and about 30 mm, inclusive. In one aspect, the disk hub 600 has a base plate portion 602 and a stem portion 604 on a top side of the base plate portion 602. The stem portion 604 extends in a height direction that is substantially perpendicular to the top side of the base plate portion 602. In one embodiment, the stem portion 604 has a top portion 606 and a frustoconical portion 608. The top portion 606 has a top surface 610 (e.g., flat surface) and a curved surface 612 extending between the top surface 610 and the frustoconical portion 608.

In one embodiment, the stem portion 604 further includes a cylindrical portion 614 on the base plate portion 602. The frustoconical portion 608 extends between the top portion 606 and the cylindrical portion 614. In some embodiments, the cylindrical portion 614 may have a height (H2 in FIG. 6) between about 0.5 mm and about 5 mm, inclusive. The base plate portion 602 forms the bottom or base of the disk hub 600 for supporting and retaining the magnetic recording medium during FTIR testing. In some embodiments, the base plate portion 602 may have a thickness (H3 in FIG. 6) of about 1.1 mm. During FTIR testing and film thickness measurements, the magnetic recording medium 406 rests on the base plate portion 602 with the stem portion 604 traversing the opening 502 (see FIG. 5) of the magnetic recording medium 406.

In one aspect, the curved surface 612 is formed by a smooth sloping edge or chamfer with a suitable radius (e.g., between about 5 mm and about 10 mm, inclusive). The curved surface 612 removes sharp edges on the top portion so that when the magnetic recording medium accidently comes in contact with the top portion 606 of the disk hub during FTIR testing, potential damages (e.g., surface scratches) to the media surface can be reduced or avoided because the curved surface 612 can lessen the impact force on the magnetic recording medium. In some embodiments, the curved surface 612 may be formed by one or more smooth surfaces that may have the same or different radius. In some embodiments, the curved surface 612 may not have a fixed radius. In some embodiments, the curved surface 612 may be replaced by multiple flat surfaces adjoining together without forming any acute angle.

In one aspect, the frustoconical portion 608 may have different diameters (or radii) at different distances from the base plate portion 602. For example, the frustoconical portion 608 has a first diameter at a first end near the cylindrical portion 614 and a second diameter at a second end near the top portion 606 (e.g., the curved surface 612). The diameter of the frustoconical portion 608 may change gradually from the first diameter to the second diameter. The first diameter (lower diameter) may be equal to or larger than the second diameter (upper diameter). The cylindrical portion 614 may have a fixed diameter (D1 in FIG. 6) that is equal to the largest diameter (e.g., lower diameter) of the frustoconical portion 608.

The base plate portion 602 may have a diameter (D2 in FIG. 6) suitably sized to improve the stability of the magnetic recording medium during FTIR testing and film thickness measurements when the magnetic recording medium is rotated to different angles or positions. In one example, an operator can use a clamp (or the like) to hold the outside edges of the magnetic recording medium in order to rotate the magnetic recording medium. In some embodiments, the base plate portion 602 may have a diameter between about 27 mm and about 30 mm, inclusive. In one example, the diameter of the base plate portion 602 may be about 28.3 mm. In some embodiments, the diameter D2 of the base plate portion 602 may be larger than the diameter D1 of the cylindrical portion 614 or frustoconical portion 608, for example, by about 2.2 mm to about 5.2 mm.

To further reduce potential media surface damages due to any contact between the media surface and the disk hub, the disk hub 600 is made of a soft and chemically stable material (e.g., thermoplastic polymer). When the disk hub is made of a material softer than metal (e.g., stainless steel), media surface damage can be reduced or avoided due to contact between the disk hub and the magnetic recording medium. In some embodiments, the disk hub may be made of a thermoplastic polymer, for example, in the poly aryl ether ketone (PAEK) family that can be used in various engineering applications. The PAEK family may include poly ether ketone (PEK), poly ether ketone ketone (PEKK), poly ether ether ketone ketone (PEEKK), poly ether ketone ether ketone ketone (PEKEKK), and poly ether ether ketone (PEEK). In one example, the disk hub 600 may be made of a PEEK material. Compared to other materials in the PAEK family, PEEK offers a combination of properties suitable as a material for manufacturing the disk hub 600 that is often used in a cleanroom environment. For example, PEEK has a suitable combination of fatigue resistance and chemical resistance, with good friction as well as wear properties. PEEK also has low moisture absorption, stable dielectric (insulating) properties, good dimensional stability and inherently low flammability. Further, a PEEK material has a crystalline nature that is a desirable property for a disk hub used in FTIR testing a cleanroom setting.

With the above-described properties, a PEEK disk hub can provide stable performance in FTIR testing applications for a long period of time. For example, a PEEK disk hub can maintain FTIR measurement accuracy by effectively eliminating or reducing corrosion, wear, friction, and outgas contaminants from the disk hub for a long period of time. PEEK materials are also versatile in processing which allows the complex geometry of a disk hub to be formed (e.g., molded-in) without using labor intensive post-machining steps used for making a metal disk hub. This, in turn, helps to reduce the cost for fabricating the PEEK disk hub.

Figure 7:
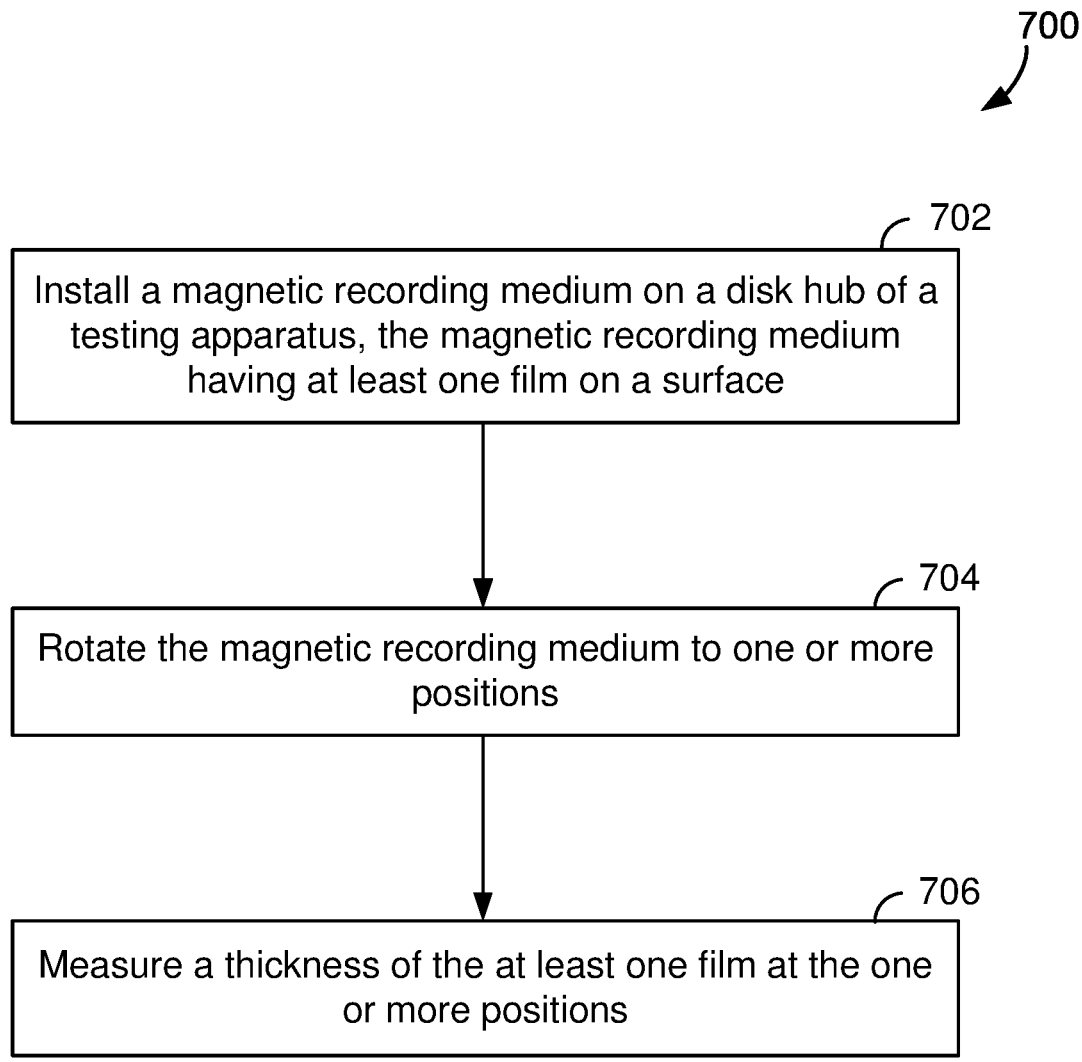
FIG. 7 is a flowchart illustrating a process for measuring the thickness of a lubricant film of a magnetic recording medium in accordance with some aspects of the disclosure.

FIG. 7 is a flowchart illustrating a process 700 for measuring a film thickness of a magnetic recording medium using the disk hub 600 in accordance with some aspects of the disclosure. In one example, process 700 can be used to measure the lubricant film thickness of the magnetic recording medium 300 or 406 using the apparatus 400. At block 702, a magnetic recording medium can be installed on a disk hub of an FTIR testing apparatus, and the magnetic recording medium has at least one film (e.g., a lubricant layer 316) on a media surface. For example, the testing apparatus may be the FTIR measurement apparatus 400 described above in relation to FIG. 4. The disk hub may be the same as the disk hub 600 described in relation to FIG. 6. In one example, the disk hub may be made of a soft material (e.g., a PEEK material) and has a smooth top surface or shape that can reduce potential surface damages to the magnetic recording medium during an FTIR measurement process and handling. At block 704, the magnetic recording medium is rotated to one or more positions (e.g., angular positions). For example, the magnetic recording medium may be rotated about the disk hub by a person or a machine using a clamp to hold the outside edges of the magnetic recording medium. At block 706, the apparatus 400 can measure a thickness of at least one film (e.g., a lubricant film) at one or more positions.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 8:
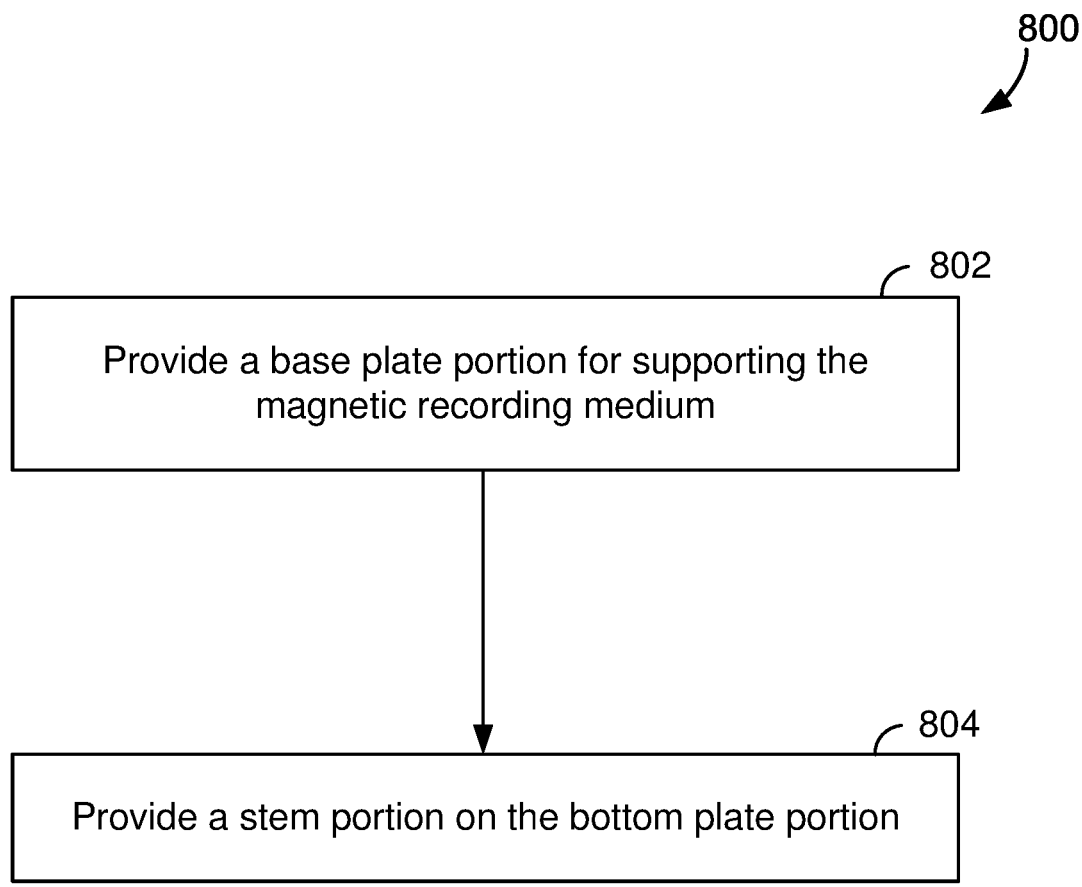
FIG. 8 is a flowchart illustrating a process for manufacturing a disk hub in accordance with some aspects of the disclosure.

FIG. 8 is a flowchart illustrating a process 800 for manufacturing a disk hub in accordance with some aspects of the disclosure. The process 800 may be used to manufacture the disk hub 600 described above for retaining a magnetic recording medium during FTIR testing. In one embodiment, the method can form the disk hub using a soft material, for example, a thermoplastic polymer (e.g., PEEK). At block 802, the method manufactures the disk hub to provide a base plate portion for supporting an inner diameter area of the magnetic recording medium. At block 804, the method manufactures the disk hub to provide a stem portion on the base plate portion. The stem portion includes a frustoconical portion on the base plate portion and a top portion on the frustoconical portion. In some embodiment, the disk hub may be made of a material selected from the group consisting of PEK, PEKK, PEEKK, PEKEKK, and PEEK.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

It shall be appreciated by those skilled in the art in view of the present disclosure that although various exemplary fabrication methods are discussed herein with reference to magnetic recording disks, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A disk hub for retaining a magnetic recording medium comprising an annulus shape and a layer configured for magnetic recording, the disk hub comprising:
    a base plate portion for supporting an inner diameter area of the magnetic recording medium; and a stem portion on the base plate portion, the base plate portion and the stem portion formed as a unitary body, the stem portion comprising:
a frustoconical portion on the base plate portion; and
a top portion on the frustoconical portion,
wherein at least the top portion of the stem portion comprises a material with a hardness less than that of stainless steel.

2. The disk hub of claim 1, wherein the material comprises a thermoplastic or poly aryl ether ketone (PAEK) polymer.

3. The disk hub of claim 2, wherein the material is selected from the group consisting of poly ether ketone (PEK), poly ether ketone ketone (PEKK), poly ether ether ketone ketone (PEEKK), poly ether ketone ether ketone (PEKEKK), poly ether ether ketone (PEEK), and combinations thereof.

4. The disk hub of claim 3, wherein the material comprises PEEK.

5. The disk hub of claim 1, wherein a diameter of the base plate portion is between 27 mm and 30 mm, inclusive.

6. The disk hub of claim 5, wherein a diameter of the base plate portion is 28.6 mm, and a thickness of the base plate portion is 1.1 mm.

7. The disk hub of claim 1, wherein the stem portion further comprises:
a cylindrical portion between the base plate portion and the frustoconical portion.

8. The disk hub of claim 7, wherein a diameter of the cylindrical portion is smaller than a diameter of the base plate portion, by about 2.2 mm to about 5.2 mm.

9. The disk hub of claim 7, wherein the frustoconical portion comprises a first end extending to the cylindrical portion and a second end extending to the top portion, wherein a diameter of the first end is larger than a diameter of the second end.

10. The disk hub of claim 1, wherein the top portion comprises a top surface and a curved surface extending between the top surface and the frustoconical portion.

11. The disk hub of claim 10, wherein a radius of the curved surface is between 5 mm and 10 mm, inclusive.

12. An apparatus for characterizing a magnetic recording medium for a data storage device, comprising:
a disk hub configured to retain and enable the magnetic recording medium to be rotated to one or more positions, wherein the disk hub comprises:
a base plate portion for supporting an inner diameter area of the magnetic recording medium; and
a stem portion on the base plate portion, the base plate portion and the stem portion formed as a unitary body, the stem portion comprising:
a frustoconical portion on the base plate portion; and
a top portion on the frustoconical portion, wherein at least the top portion of the stem portion comprises a material with a hardness less than that of stainless steel; and
a measurement assembly configured to measure a thickness of at least one film on a data recording surface of the magnetic recording medium at the one or more positions.

13. The apparatus of claim 12, wherein the material comprises a thermoplastic or poly aryl ether ketone (PAEK) polymer.

14. The apparatus of claim 13, wherein the material is selected from the group consisting of poly ether ketone (PEK), poly ether ketone ketone (PEKK), poly ether ether ketone ketone (PEEKK), poly ether ketone ether ketone (PEKEKK), poly ether ether ketone (PEEK), and combinations thereof.

15. The apparatus of claim 14, wherein the material comprises PEEK.

16. The apparatus of claim 12, wherein a diameter of the base plate portion is between 27 mm and 30 mm, inclusive.

17. The apparatus of claim 16, wherein a diameter of the base plate portion is 28.6 mm, and a thickness of the base plate portion is 1.1 mm.

18. The apparatus of claim 12, wherein the stem portion further comprises:
a cylindrical portion between the base plate portion and the frustoconical portion.

19. The apparatus of claim 18, wherein a diameter of the cylindrical portion is smaller than a diameter of the base plate portion.

20. The apparatus of claim 18, wherein the frustoconical portion comprises a first end extending to the cylindrical portion and a second end extending to the top portion, wherein a diameter of the first end is larger than a diameter of the second end.

21. The apparatus of claim 12, wherein the top portion comprises a top surface and a curved surface extending between the top surface and the frustoconical portion.

22. The apparatus of claim 21, wherein a radius of the curved surface is between 5 mm and 10 mm, inclusive.

23. A method of manufacturing a disk hub for retaining a magnetic recording medium comprising an annulus shape and a layer configured for magnetic recording, the method comprising:
forming the disk hub using a thermoplastic polymer, comprising,
providing a base plate portion for supporting an inner diameter of the magnetic recording medium; and
providing a stem portion on the base plate portion, the base plate portion and the stem portion formed as a unitary body, wherein the stem portion comprises:
a frustoconical portion on the base plate portion; and
a top portion on the frustoconical portion.

24. The method of claim 23, wherein the thermoplastic polymer is selected from the group consisting of poly ether ketone (PEK), poly ether ketone ketone (PEKK), poly ether ether ketone ketone (PEEKK), poly ether ketone ether ketone ketone (PEKEKK), poly ether ether ketone (PEEK), and combinations thereof.

25. The method of claim 24, wherein the thermoplastic polymer comprises PEEK.

* * * * *